United States Patent [19]
Everingham

[11] Patent Number: 5,184,773
[45] Date of Patent: Feb. 9, 1993

[54] PRESSURE REGULATING HEATER CONTROL VALVE

[75] Inventor: Gary M. Everingham, Chatham, Canada

[73] Assignee: Siemens Automotive Limited, Chatham, Canada

[21] Appl. No.: 903,645

[22] Filed: Jun. 24, 1992

[51] Int. Cl.⁵ ............................................. F01P 7/14
[52] U.S. Cl. ............................. 237/12.3 B; 137/625.5; 137/116; 165/38
[58] Field of Search ................ 137/625.27, 625.5, 508, 137/116; 165/35, 38; 237/12.3 B

[56] References Cited

U.S. PATENT DOCUMENTS

| | | | |
|---|---|---|---|
| 2,277,814 | 3/1942 | Booth | 237/12.3 B X |
| 2,392,214 | 1/1946 | Cruzan | 165/38 X |
| 3,329,165 | 7/1967 | Lang | 137/625.5 |
| 3,835,646 | 9/1974 | Ranft | 137/625.5 X |
| 4,556,171 | 12/1985 | Fukami | 237/12.3 B |
| 4,874,010 | 10/1989 | DeJong | 165/38 X |
| 4,878,514 | 11/1989 | DeJong | 137/110 |

Primary Examiner—Alan Cohan
Attorney, Agent, or Firm—George L. Boller; Russel C. Wells

[57] ABSTRACT

A pressure relief function is incorporated into a proportional solenoid controlled heater valve for an automobile heater. One of two internal valve seats is spring-biased against an internal shoulder and is exposed to pressure differential across it. When inlet pressure from the engine coolant pump seeks to rise above a predetermined level, the spring-loaded seat unseats thereby diverting some of the flow away from the heater core and back to the pump inlet.

22 Claims, 1 Drawing Sheet

PRESSURE REGULATING HEATER CONTROL VALVE

FIELD OF THE INVENTION

This invention relates to a heater control valve that is used to control the flow of coolant through the heater core of an automobile heater.

BACKGROUND AND SUMMARY OF THE INVENTION

A typical automobile heater comprises a heat exchanger that is commonly referred to as a heater core. Hot coolant from the automobile engine's cooling system that is allowed to flow through the core exchanges heat to air that is forced across the core. The heated air is discharged into the automobile's passenger compartment. Typically engine coolant is pumped through the heater core from a pump that is driven by the automobile's engine. A heater control valve sets the extent to which the flow is restricted, and hence can control the thermal energy input to the heater.

A typical automobile is powered by an internal combustion engine which has a coolant pump that is engine-driven and circulates coolant through the cooling system. The typical pump is a device whose outlet pressure is related to engine speed. In general, the higher the engine speed, the higher the pump outlet pressure. Variations in coolant pressure within a heater core create varying stresses in the core passageways and at its joints. Certain high pressures that create unacceptably high stresses in the core may occasion core failure. Repeating pressures that individually may not be deemed excessive may, over time, fatigue a core to the point of failure.

One solution to such a potential problem would of course be to make the heat exchanger of heavier materials. Such a solution however adds weight and cost to the automobile at a time when weight and cost savings are especially important to automobile manufacturers. Another solution is to incorporate a pressure limiting, or relief, function that will be effective in limiting the pressure that can be imposed within coolant passageways of a heat exchanger. One example of a relief type function incorporated into a heater control valve is shown in commonly assigned U.S. Pat. No. 4,878,514. This relief function is in the nature of a flow diverter comprising a deflector that increasingly diverts the flow from the core as the pump output increases.

The present invention is directed to a heater control valve embodying a pressure relief function in a new and unique way. The heater control valve is also operated by a proportional solenoid, which allows coolant flow through the core to be better modulated, even to an extent that it may be possible to eliminate from the heater an internal blending door that is used to blend the heated air with non-heated air prior to discharge to the passenger compartment.

Further features, advantages, and benefits of the invention, along with those already mentioned, will be seen in the ensuing detailed description of a presently preferred embodiment representing the best mode contemplated at this time for carrying out the invention.

DESCRIPTION OF THE PREFERRED EMBODIMENT

Figure 1:
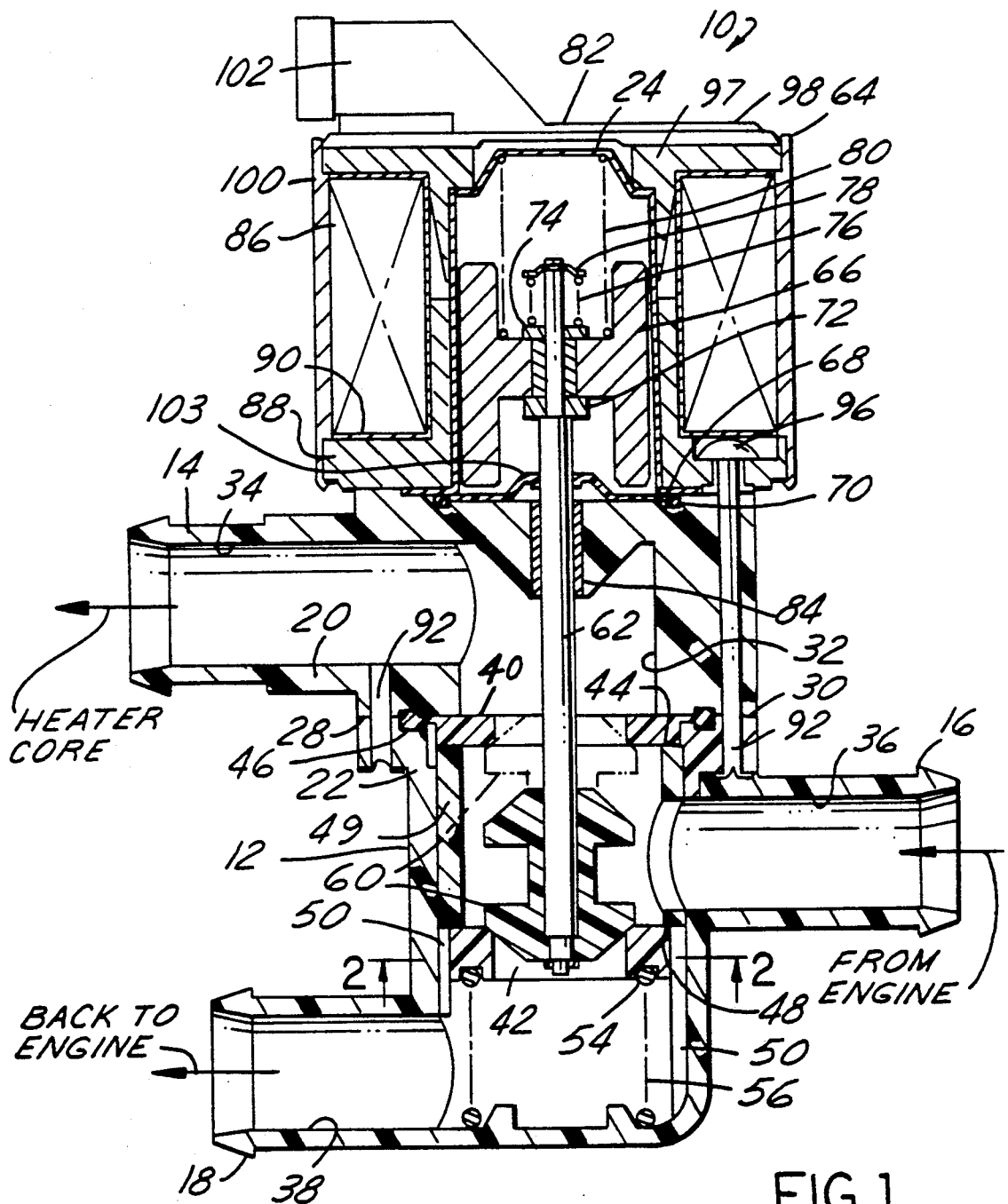
FIG. 1 is a front elevational view in cross section through an exemplary heater control valve embodying principles of the invention.

An exemplary heater control valve 10 embodying principles of the invention comprises a body 12 having three ports 14, 16, 18 via which the valve is connected in fluid circuit with a heater core (not shown) and an engine cooling system (also not shown). These ports are in the form of nipples onto which the ends of coolant carrying conduits, or hoses, (not shown) may be fitted in any known fluid-tight manner. Body 12 actually comprises several parts assembled together, two main body parts 20 and 22 which may be a suitable metal or plastic composition, and a cup 24. Port 14 is integrally formed in main body part 20 while ports 16 and 18 are integrally formed in body part 22. Parts 20 and 22 fit together at mating surfaces 28 and 30, and cooperatively define a straight main bore 32, one portion of which is transversely intersected at a right angle in part 20 by a passage 34 leading to port 14 and another portion of which is transversely intersected at right angles in part 22 by a passage 36 leading to port 16 and by a passage 38 leading to port 18. Cup 24 closes the end of main bore 32 that is proximate port 14. Cup 24 is a non-magnetic material, for reasons that will become apparent hereinafter.

First and second circular annular valve seats 40 and 42 are disposed within main bore 32 and circumscribe the coolant flow path through it. Valve seat 40 has a rectangular radial cross section whose radially outer margin is captured in a sandwiched fashion between surfaces 28 and 30. An internal shoulder 44 is provided in circumscription of main bore 32 at surface 30 to form, in cooperation with a juxtaposed portion of surface 28, a three-sided, radially inwardly open circular groove in which the outer margin of valve seat 40 is trapped. Radially outwardly of this groove is a smaller circular groove containing an 0-ring seal 46 that is integrally joined to valve seat 40 by a web of material and renders the joint between the two confronting surfaces 28 and 30 fluid-tight around bore 32 so that coolant passing through the valve does not leak out between surfaces 28 and 30.

Figure 2:
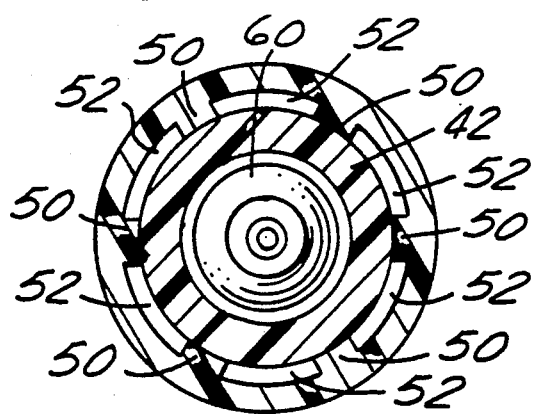
FIG. 2 is a transverse cross-sectional view as taken in the direction of arrows 2—2 in FIG. 1.

A shoulder 48 is provided in bore 32 immediately below its intersection with passage 36. This shoulder is circumferentially bounded by a series of alternating ribs 50 and slots 52 (FIG. 2), these ribs and slots being set radially outwardly from the radially inner margin of the shoulder and extending downwardly from that shoulder. Both shoulders 44, 48 are provided by pressing a plastic tube 49 into the bore in part 22 until the lower end of the tube 49 abuts ribs 50, as shown. The sidewall of tube 49 has a hole that registers with passage 36.

Valve seat 42 has a nominally rectangular radial cross section, with one surface facing shoulder 48 and an opposite surface containing a circumferentially extending groove 54 that faces away from shoulder 48. The O.D. surface of valve seat 42 fits closely within the series of ribs 50 and slots 52. A example of a material that is suitable for valve seat 42 is high tear strength silicone elastomer having 95 durometer.

A helical coil spring 56 is disposed partially compressed in bore 32. The lower end of the spring is seated in a spring seat formation as shown while its upper end is seated in groove 54. Spring 56 resiliently urges valve seat 42 against shoulder 48, and FIG. 1 shows the radially outer margin of the upper surface of valve seat 42 seated against shoulder 48.

A valve element 60, in the form of a pintle, is disposed in bore 32 for coaction with valve seats 40 and 42 respectively. FIG. 1 shows it seating on an annular seating zone that is provided by the radially inner margin of the upper surface of valve seat 42. A stem 62 extends from valve element 60 to provide for operative connection of the valve element with a solenoid 64 mounted atop body 12.

Solenoid 64 has an armature 66 that is disposed within cup 24. Armature 66 is a tube whose I.D. is spanned by a transverse wall about half-way along its length. Cup 24 is circular cylindrical in shape and provides guidance for the travel of armature 66, as more fully described hereinafter. An outwardly turned circular flange 68 at the rim of the cup's sidewall is disposed against an upper face of body part 20 which contains a circumferential groove that is overlapped by that flange. An O-ring seal 70, being part of a lip seal 103, is disposed in that groove and provides a fluid-tight seal around the joint between cup 24 and body part 20 so that coolant within the valve does not leak out via that joint.

The connection of stem 62 to armature 66 is a spring-loaded one. Centrally in its transverse wall, armature 66 contains a through-hole through which the diametrically reduced free end of stem 62 passes. The stem contains a shoulder, and a washer 72 is disposed over the stem between this shoulder and armature 66. A second washer 74 is disposed over stem 62 and against the opposite side of armature 66 from washer 72. A small helical spring 76 is disposed partially compressed between washer 74 and a springgrip washer 78 that is affixed to the free end of stem 62 just short of its termination. Normally spring 76 resiliently biases stem 62 and valve element 60 upwardly relative to armature 66 so that washer 72 abuts the armature. This means of connection provides for armature 66 to be resiliently displaced upwardly relative to stem 62 and valve element 60 under certain conditions of operation, such as hereinafter described. A larger helical spring 80 is disposed partially compressed between an end wall 82 of cup 24 and armature 66 for resiliently biasing the armature, and hence valve element 60 via stem 62, downwardly so as to seat valve element 60 on valve seat 42, as shown by FIG. 1. Internally of bore 32, at the end which is toward armature 66, there is affixed in any suitable manner a guide member 84 that provides guidance for axial travel of stem 62, but like lip seal 103, but does not fluid-isolate the interior of cup 24 from bore 32.

Solenoid 64 further comprises a tubular coil 86 that is supported by a coil holder 88. Coil holder 88 has a radial wall 90 that underlies coil 86 and confronts the upper surface of body part 14. Shanks 92 of headed fasteners 93 (illustrated for example as tubular rivets) pass through holes in wall 90 to engage holes in a flange of body 12 thereby uniting parts 20, 22, and 88 in assembly, with wall 90 sandwiching flange 68 against the upper surface of body part 20 and compressing O-ring 70 in the process. Coil 86 is disposed in overlying relation to fastener heads 96. The ends of shanks 92 are rolled over to complete the fastening of parts 20, 22, and 88.

The remainder of solenoid 64 comprises an end piece, a cap 98 and a magnetically conductive tube 100. End piece 97 and cap 98 close the upper end of coil 86, and cap 98 contains an electrical connector 102 via which the coil is electrically energized. End piece 97, tube 100, and coil holder 88 are of magnetically conductive material and provide a magnetic flux return path for the coil flux.

An exemplary connection of valve in a coolant circuit comprises connecting port 16 to an outlet of the engine-driven coolant pump, connecting port 14 to an inlet of the heater core, and connecting port 18 to an inlet of the pump. The heater core would also have an outlet connected to the pump inlet.

FIG. 1 portrays the condition of valve 10 when coil 86 is not energized. In this condition the valve allows fluid communication between ports 16 and 14 while disallowing port 18 to communicate with ports 16 and 14.

Solenoid 64 is a proportional solenoid so that as coil 86 is increasingly energized, magnetic flux issued by the coil acts on armature 66 to cause valve element 60 to be increasingly moved away from valve seat 42 toward valve seat 40, increasingly compressing coil 80 in the process. The magnetic flux passes to the armature because cup 24 is of non-magnetically conductive material, such as brass. The sidewall of cup 24 has a close fit to the O.D. of armature 66 for guiding the axial travel of the armature within the cup. The unseating of valve element 60 from valve seat 42 will be effective to divert some of the flow that has entered port 16 away from port 14 to port 18 instead. The extent to which coil 86 is energized determines the selective positioning of valve element 60 within bore 32 and hence the extent to which such diversion occurs. Thus, the flow into the heater core is related to the electric current that is allowed to flow in coil 86.

In use, coolant will occupy the interior of cup 24 so that the armature is surrounded by coolant. The fit of the armature to the cup's sidewall allows for coolant to flow past the armature generally unrestricted during armature travel so that the fact that the armature is in the coolant will not create vacuum or hydraulic resistance that might impair the armature's response.

At a certain magnitude of current, coil 86 is sufficiently energized to seat valve element on valve seat 40 (broken line position of 60 in FIG. 1). In this condition valve 10 allows communication between ports 16 and 18 while disallowing port 14 to communicate with ports 16 and 18 so that the entire entering flow is diverted from the heater core. To the extent that there may be any upward overtravel of armature 66 once valve element 60 closes the flow to port 14, it is taken up by spring 76 absorbing the lost motion between stem 62 and armature 66.

When coil 86 is not energized, the unique pressure relief feature of valve 10 provides for the diversion of some of the entering flow to port 18. Such diversion will occur when the pressure seeks to rise above a certain value, and here is how it happens.

Selected surface areas of valve seat 42 on opposite sides of the annular seating zone on which valve element 60 is seated are exposed to sense the pressure differential acting on them. At a predetermined pressure differential, valve seat 42 will be forced downwardly, increasingly compressing spring 56 and unseating from shoulder 48. Some of the coolant that has entered the valve will now be diverted to port 18 by passing through the opening created between shoulder 48 and valve seat 42 and into and through slots 52. Since armature 66 will typically be designed with some downward overtravel capability, valve element 60 will follow the unseated valve seat 42 to the extent permitted by such overtravel. The axial travel of valve seat 42 within bore 32 is always guided by the radially inner faces of ribs 50 since the ribs axially overlap the O.D. of valve seat 42. This pressure relief function is intended to limit the coolant pressure to which the heater core is exposed and thereby limit pressure-induced stresses in the core.

While a presently preferred embodiment of the invention has been illustrated and described, it should be appreciated that principles are applicable to other embodiments.

What is claimed is:

1. In an automotive vehicle having a passenger compartment and a heating system for the passenger compartment that comprises a heat exchanger through which heat delivering liquid is pumped by a pumping means to the extent allowed by a heater control valve, the improvement wherein said heater control valve comprises first, second and third ports via which it is fluid connected with said pumping means and said heat exchanger, said valve comprising a body having a straight bore, said ports having communication with said bore at spaced apart locations along the length of said bore, a first valve seat circumscribing said bore between the location at which said first port has communication with said bore and the location at which said second port has communication with said bore, a second valve seat circumscribing said bore between the location at which said second port has communication with said bore and the location at which said third port has communication with said bore, said second valve seat having an annular shape, a valve element disposed within said bore for selective positioning within said bore between said valve seats for respective coaction with said valve seats to selectively 1) seat on an annular seating zone of said second seat and thereby allow fluid communication between said first and second ports while disallowing said third port to fluid communicate with said first and second ports through said second valve seat, 2) seat on neither of said seats and thereby allow fluid communication between all three ports, and 3) seat on said first seat and thereby allow fluid communication between said second and third ports while disallowing said first port to fluid communicate with said second and third ports, said bore comprising a shoulder that faces away from the location at which said second port communicates with said bore and toward the location at which said third port communicates with said bore, and means acting on said second valve seat for selectively positioning same within said bore comprising means resiliently biasing said second valve seat toward said shoulder and means exposing selected surface areas of said second valve seat that are to either side of said seating zone to fluid pressure differential acting on said surface areas such that when there is less than a certain pressure differential acting on said selected surface areas, said second valve seat is seated on said shoulder, and when there is greater than a certain selected pressure differential acting on said surface areas, said second valve seat is unseated from said shoulder.

2. The improvement set forth in claim 1 in which said third port is arranged at a right angle to said bore.

3. The improvement set forth in claim 1 in which said body comprises two parts assembled together each of which contains a respective portion of said bore, one of which contains said first port, and the other of which contains said second and third ports.

4. The improvement set forth in claim 3 in which said first valve seat is disposed between confronting surfaces of said two parts.

5. The improvement set forth in claim in which said bore contains a series of alternating ribs and slots extending axially from said shoulder to axially overlap and circumferentially bound said second valve seat.

6. The improvement set forth in claim 1 in which said valve element is operatively coupled with a solenoid that is mounted on said body for selective positioning in accordance with the extent to which said solenoid is energized by electric current flowing in a coil of the solenoid.

7. The improvement set forth in claim 6 in which said solenoid comprising a coil holder that supports said coil coaxial with said bore and that has a wall disposed to confront said body, and one or more headed fasteners having shanks passing through holes in said wall to fasten to said body and having heads disposed between said coil and said wall.

8. The improvement set forth in claim 6 in which said body further comprises a non-magnetic cup closing one end of said bore, and said solenoid has an armature that is disposed within said cup.

9. The improvement set forth in claim 8 in which said solenoid also comprises a coil holder that supports said coil coaxial with said cup and that has a wall disposed to confront said body, and said cup comprises a flange at the cup's rim that is disposed between said wall and a part of said body that contains one of said ports.

10. The improvement set forth in claim 1 in which said second valve seat comprises an annular groove in a surface thereof that faces away from said shoulder, and said means resiliently biasing said second valve seat toward said shoulder comprises comprises a helical coil spring that has one end seated in said annular groove.

11. The improvement set forth in claim 1 in which said first port is fluid connected to an inlet of said heat exchanger, and said second port is fluid connected to a high pressure side of said pumping means.

12. The improvement set forth in claim 11 in which said third port and an outlet of said heat exchanger are fluid connected to a low pressure side of said pumping means.

13. A heater control valve comprising first, second and third ports via which it is fluid connected with a pumping means and a heat exchanger, said valve comprising a body having a straight bore, said ports having communication with said bore at spaced apart locations along the length of said bore, a first valve seat circumscribing said bore between the location at which said first port has communication with said bore and the location at which said second port has communication with said bore, a second valve seat circumscribing said bore between the location at which said second port has communication with said bore and the location at which said third port has communication with said bore, said second valve seat having an annular shape, a valve element disposed within said bore for selective positioning within said bore between said valve seats for respective coaction with said valve seats to selectively 1) seat on an annular seating zone of said second seat and thereby allow fluid communication between said first and second ports while disallowing said third port to fluid communicate with said first and second ports through said second valve seat, 2) seat on neither of said seats and thereby allow fluid communication between all three ports, and 3) seat on said first seat and thereby allow fluid communication between said second and third ports while disallowing said first port to fluid communicate with said second and third ports, said bore comprising a shoulder that faces away from the location at which said second port communicates with said bore and toward the location at which said third port communicates with said bore, and means acting on said second valve seat for selectively positioning same within said bore comprising means resiliently biasing said second valve seat toward said shoulder and means exposing selected surface areas of said second valve seat that are to either side of said seating zone to fluid pressure differential acting on said surface areas such that when there is less than a certain pressure differential acting on said selected surface areas, said second valve seat is seated on said shoulder, and when there is greater than a certain selected pressure differential acting on said surface areas, said second valve seat is unseated from said shoulder.

14. A heater control valve as set forth in claim 13 in which said third port is arranged at a right angle to said bore.

15. A heater control valve as set forth in claim 13 in which said body comprises two parts assembled together each of which contains a respective portion of said bore, one of which contains said first port, and the other of which contains said second and third ports.

16. A heater control valve as set forth in claim 15 in which said first valve seat is disposed between confronting surfaces of said two parts.

17. A heater control valve as set forth in claim 13 in which said bore contains a series of alternating ribs and slots extending axially from said shoulder to axially overlap and circumferentially bound said second valve seat.

18. A heater control valve as set forth in claim 13 in which said valve element is operatively coupled with a solenoid that is mounted on said body for selective positioning in accordance with the extent to which said solenoid is energized by electric current flowing in a coil of the solenoid.

19. A heater control valve as set forth in claim 18 in which said solenoid comprising a coil holder that supports said coil coaxial with said bore and that has a wall disposed to confront said body, and one or more headed fasteners having shanks passing through holes in said wall to fasten to said body and having heads disposed between said coil and said wall.

20. A heater control valve as set forth in claim 18 in which said body further comprises a non-magnetic cup closing one end of said bore, and said solenoid has an armature that is disposed within said cup.

21. A heater control valve as set forth in claim 20 in which said solenoid also comprises a coil holder that supports said coil coaxial with said cup and that has a wall disposed to confront said body, and said cup comprises a flange at the cup's rim that is disposed between said wall and a part of said body that contains one of said ports.

22. The improvement set forth in claim 13 in which said second valve seat comprises an annular groove in a surface thereof that faces away from said shoulder, and said means resiliently biasing said second valve seat toward said shoulder comprises comprises a helical coil spring that has one end seated in said annular groove.

* * * * *